2,731,004

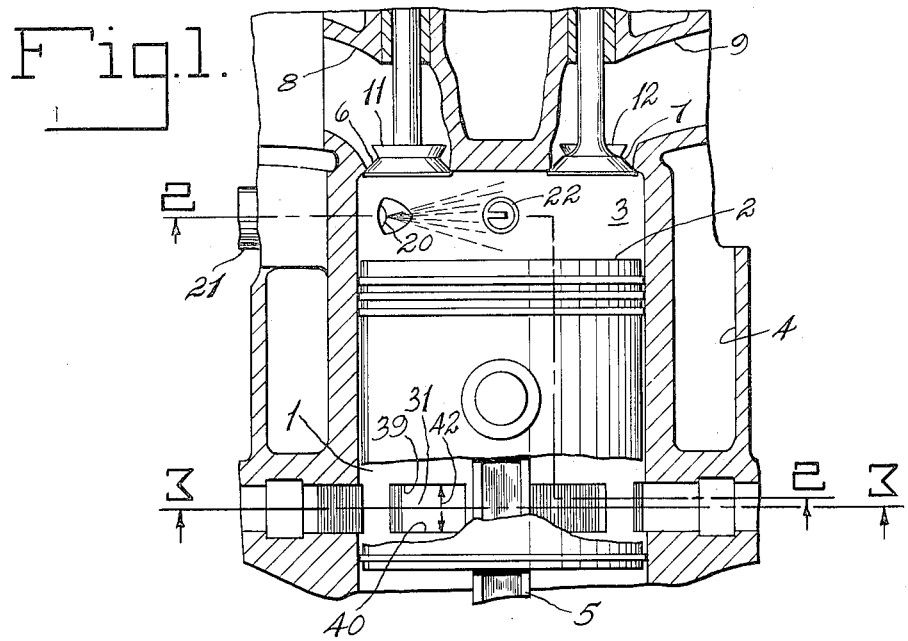
Fig.1.
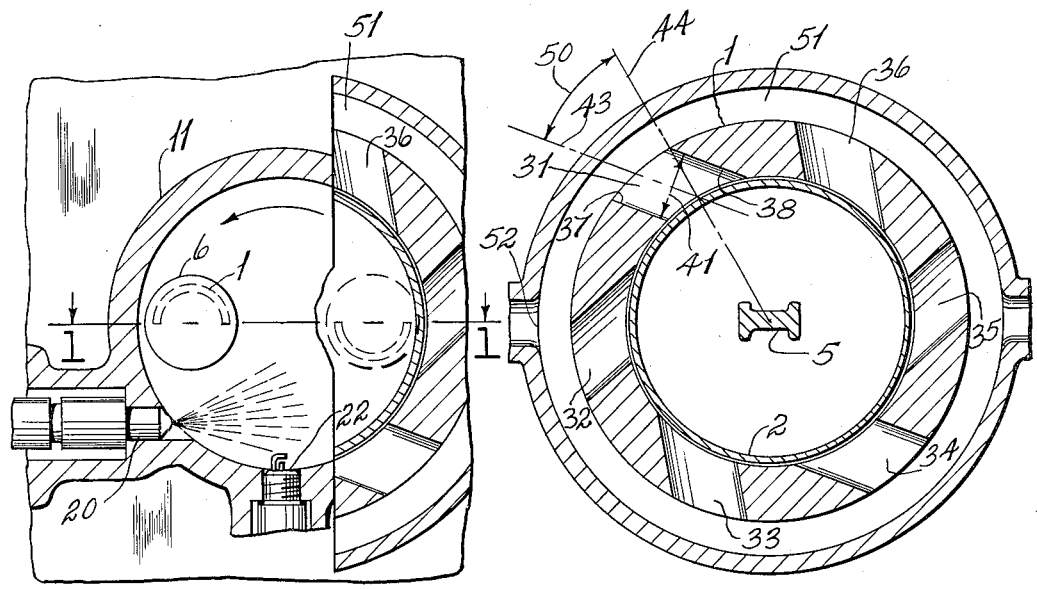
Fig.2.  Fig.3.
INVENTOR.
STEPHEN HOPKINS
BY
ATTORNEY United States Patent Office 2,731,004
Patented Jan. 17, 1956

EXHAUST PORTS FOR INTERNAL-COMBUSTION ENGINES

Stephen Hopkins, Fishkill, N. Y., assignor to The Texas Company, New York, N. Y., a corporation of Delaware Application January 26, 1953, Serial No. 333,230

2 Claims. (Cl. 123—65)

This invention relates to internal combustion engines of the type employing air swirl in the main cylinder combustion space, preferably with fuel injection and controlled combustion of the non-knocking type as disclosed in the patent to Barber, No. 2,484,009, and employing removal of exhaust gases through piston controlled exhaust ports disposed in the cylinder wall. More particularly, the present invention relates to an improvement in exhaust ports for engines of the aforesaid type enabling more efficient operation with improved scavenging of exhaust gases.

An object of this invention is to provide an improved cylinder wall exhaust port for air swirl internal combustion engines.

Another object is to provide an improved exhaust port orientation enabling improved exhaust gas scavenging from such engines.

Another object is to provide an exhaust port enabling improved scavenging of air swirl internal combustion engine cylinders with minimized directional changes of the moving exhaust gases therein.

These and other objects and advantages of the invention will be apparent from the following description taken in connection with the accompanying drawings wherein:

In the drawings:

Fig. 1 is a partial vertical sectional view, taken on the plane of line 1—1 of Fig. 2, of a reciprocating piston engine constructed in accordance with the present invention.

Fig. 2 is a horizontal sectional view taken on the plane of line 2—2 of Fig. 1.

Fig. 3 is a horizontal sectional view taken on the line 3—3 of Fig. 1, and showing the details of exhaust ports constructed in accordance with the present invention.

Briefly, the present invention arises from the discovery that the angular orientation of the exhaust ports relative to the cylinder wall has a considerable effect on the scavenging ability of the exhaust ports, and furthermore that there is an optimum angle at which the exhaust ports can be oriented to achieve most effective scavenging through the exhaust ports of the waste combustion products from the main cylinder combustion space.

Referring to Figs. 1 and 2, the engine includes a cylinder 1 with piston 2 forming a main cylinder combustion space 3, cooling jacket 4, and connecting rod 5 running to the usual crankshaft, not shown. Mounted in the cylinder head and positioned on opposite sides of the main cylinder combustion space 3 are two engine-timed air intake valves 6 and 7, which control admission of air to the combustion space through intake ports 8, 9. Each intake valve 6, 7 is equipped with a shroud 11, 12, extending approximately 180° around its periphery. The outer edge of each of the valves 6, 7, is located closely adjacent the periphery of the cylinder combustion space 3. The shrouds 11, 12 face in opposite directions within the combustion space and the ends of each shroud are positioned substantially on a radius of cylinder 1. This arrangement produces a swirl or rotation of the intake air charge about the cylinder combustion space 3 in the manner of rotation of a solid body, i. e., all the elements of the air rotate at substantially the same angular velocity about the axis of the cylinder 1. While two intake ports 8, 9 and valves 6, 7 are depicted, it should be understood that only one intake port and shrouded valve may be employed if desired, particularly in small diameter cylinders.

A fuel injection nozzle 20 is mounted in the side of cylinder 1 in a position to inject fuel into combustion space 3 in the direction of air swirl. The nozzle is preferably of the fuel pressure actuated type and is supplied with fuel at injection pressure from a suitable engine-driven fuel pump, not shown, through piping 21 in the conventional manner.

A spark plug 22 having electrodes is also mounted in the side wall of the cylinder on the downstream side of nozzle 20, preferably about 30° to 60° about the circumference of cylinder 1 from the locus of fuel injection. The spark plug 22 is connected to a conventional ignition circuit, not shown, which is actuated in synchronism with the engine, in the usual manner.

The cylinder 1 is also equipped with a circumferential series of exhaust ports 31, 32, 33, 34, 35, 36 whose inner ends are spaced along a circumference of cylinder 1, and lie in a cross-sectional plane of cylinder 1 somewhat above the lower portion of travel of piston 2. The several exhaust ports are identical. A detailed description of port 31 will therefore suffice for all. Port 31 is preferably rectangular in cross-section, with substantially parallel opposed side walls 37, 38 and top and bottom walls 39, 40. Preferably the port is arranged with its side walls 37, 38 disposed in planes parallel to the axis of cylinder 1, and spaced apart by a perpendicular distance 41, which defines the width of the port. The top wall 39 and bottom wall 40 of port 31 are spaced apart by a distance 42, which defines the port height. Port 31 is oriented so that its centerline or flow axis 43 is disposed at an acute angle 50 to the cylinder radius 44 at the center of the inner end of the port. The preferred value of this angle 50, measured between each port flow axis and the respective cylinder radius at the point of intersection of the flow axis with the inside of cylinder 1, will be defined more fully hereinafter.

The maximum portion of the cylinder circumference which can be apertured to provide for the several exhaust ports is limited by practical considerations such as maintenance of structural strength in the cylinder and prevention of piston ring breakage. Thus, the extent of that portion of the cylinder circumferences subtended by the exhaust ports usually aggregates only about one half of the circumference of cylinder 1.

The exhaust ports 31, 32, etc. open into an annular exhaust passage 51 which connects at 52 to an exhaust manifold, not shown. Reciprocation of the piston 2 thus controls the opening and closing of the exhaust ports, while the conventional engine-timed cam and tappet drive controls opening and closing of intake valves 6, 7 for intake ports 8, 9.

In operation of the engine above described in the manner with which the present invention is particularly suitable, the exhaust ports 31, 32, etc., are uncovered by piston 2 during the latter part of its power stroke. Products of combustion rush out through the ports and exhaust passage 51 to the exhaust manifold, thereby lowering the pressure within the cylinder substantially to atmospheric. About 20 or 25 crankshaft degrees after the exhaust ports are opened by the piston 2, the intake valves 6 and 7 open and a fresh air charge is drawn past the shrouds 11, 12, and swirls about the cylinder combustion space at high velocity, preferably of the order of four to twelve times the engine crankshaft speed. As piston 2 ascends on its compression stroke, the exhaust ports are covered by the piston, thus closing them, and the swirling air charge is compressed within the cylinder combution space 3. Initiation of fuel injection begins preferably from 70° to 20° before top dead center, with combustion of the first increment of injected fuel starting almost immediately. Spark timing is arranged to ignite the first increment of fuel-air mixture substantially as soon as combustible fuel vapor-air mixture is formed therefrom and can swirl about the cylinder combustion space 3 to the vicinity of spark plug 22.

The flame front formed from the ignition of this first increment of combustible fuel vapor-air mixture spreads across the increment, and travels counter to the direction of air swirl in the cylinder through succeeding portions of combustible mixture formed immediately in advance of the flame front as injection continues. The first formed products of combustion continue their swirling motion within the cylinder, and rotate away from flame front as fresh fuel-impregnated air rotates toward the flame front. The flame front itself tends to travel upstream in the swirling air, toward the nozzle, but this movement is counteracted by the high velocity swirling movement of the air itself within the cylinder, and by the fact that the localized increments of fuel-impregnated air closer to the nozzle are incombustibly rich. The result is that the flame front may remain comparatively stationary with respect to the side wall of cylinder 1, although it continues to travel through and consume successive increments of fuel vapor-air mixture formed immediately in advance of it.

Because there is insufficient formed combustible mixture in the cylinder combustion space to undergo spontaneous ignition or preignition prior to the time of actual positive ignition by spark plug 22, these difficulties are overcome. Moreover, at no time during the combustion period is there an accumulation of unburned combustible mixture trapped by the advancing flame front sufficient to cause spontaneous ignition. In the manner of operation above described, therefore, in accordance with the principles disclosed in the above-mentioned patent to Barber, 2,484,009, knocking of the engine is entirely prevented.

During the downward travel of piston 2 on its power stroke, the hot gases within combustion space 3 continue to swirl about the axis of cylinder 1. In order to facilitate effective scavenging of these hot waste combustion gases from the combustion space 3 the exhaust ports are disposed at an angle 50 to the radii of the cylinder through the centers of their respective inner ends, so as to be generally tangential to an inscribed circle within the cylinder cross-sectional plane. In this manner the directional change required of the rotating waste combustion gases during their exit from the cylinder is minimized, and the exhaust ports effectively serve to peel or strip the rotating gases from within the cylinder.

It has been found in accordance with the present invention that the angular disposition of the exhaust ports, relative to the cylinder radii at the point of intersection of their flow axes with the inside wall of cyinder 1, has a critical effect on the scavenging ability of the exhaust ports, and can moreover be adjusted to provide optimum scavenging effectiveness.

As the angle 50 of each exhaust port increases, approaching tangency to the cylinder, the flow coefficient of the port has been found also to increase. The term flow coefficient is well understood by those familiar with the art, and relates to a measure of the ease or facility with which fluid flow can proceed through a passage of a given configuration. To determine the flow coefficient for an exhaust port, the port is flowed in series with an A. S. M. E. standard orifice having an area equal to the cross-sectional area of the port. The flow coefficient is defined as $$C_p = C_o \sqrt{\frac{P_o}{P_p}}$$

where $C_o$ is the known flow coefficient of the standard orifice, $P_o$ is the measured pressure drop across the standard orifice, and $P_p$ is the measured pressure drop through the port.

This increase in flow coefficient with increasing exhaust port angle 50 would tend greatly to facilitate more effectively scavenging, but for the fact that, as will be apparent from Fig. 3, the actual cross-sectional area of an exhaust port must of necessity decrease as the exhaust port angle 50 increases. The reason for this is that the portion of a cylinder circumference apertured by any given port is fixed, and since the opposed side walls of each port are parallel, the width 41 of each port may be seen to vary substantially as the cosine function of the exhaust port angle. Hence, for a port of a given height, the cross-sectional area will decrease substantially as the cosine function of its angular orientation.

The present invention is based upon the discovery that as the angle 50 of each exhaust port is increased from zero to obtain an increase in the port flow coefficient, over a certain range of exhaust port angles the flow coefficient increases faster than the actual cross-sectional area of the port decreases. Hence there is an optimum exhaust port angle where the product of port flow coefficient and actual port cross-sectional area reaches a maximum value. As is well understood in the art, the product of these two factors defines the effective flow area of the port, and provides a quantitative measure of the ability of the port to permit exodus of the waste combustion gases from the cylinder space. Since there is a particular exhaust port angle at which the product of these two factors is a maximum, this angle also can serve to define the optimum angular orientation or disposition of the exhaust port to achieve most effective scavenging of the swirling waste combustion gases from the cylinder 1. In actual tests of exhaust ports constructed in the manner hereinbefore described, with swirling of the air charge at rates of from four to twelve times crankshaft speed, the angular orientation at which the product of port cross-sectional area and flow coefficient is a maximum is such that angle 50 has a value of from 25 to 35 degrees.

Thus, there has been shown and described an improved exhaust port for internal combustion engines employing swirling of the air charge about the cylinder combustion chamber, having an orientation such that the product of its flow coefficient and its actual cross-sectional area is a maximum, thereby providing for optimum effectiveness in scavenging waste combustion gases from the cylinder.

Obviously many modifications and variations of the invention, as hereinbefore set forth, may be made without departing from the spirit and scope thereof, and therefore only such limitations should be imposed as are indicated in the appended claims.

I claim:

1. In an internal combustion engine of the reciprocating piston type operating with swirling of combustion gases about the axis of an engine cylinder, means for uniflow scavenging of waste combustion gases comprising a plurality of piston controlled exhaust ports in the side wall of said cylinder substantially equal and uniform in cross section throughout their lengths and connected to an exhaust manifold, the number of said ports being the maximum allowable in view of the structural strength of said cylinder, said ports being defined by parallel walls disposed generally tangentially to inscribed circles in a cross-sectional plane of said cylinder normal to the longitudinal axis thereof, each of said ports having a flow axis disposed at an acute angle to the cylinder radius at its point of intersection with said cylinder, said acute angle having a value such that the sum of the products of the flow coefficient of each port and its cross-sectional area is a maximum, said angle being within the limits of 25° to 35°.

2. An exhaust port arrangement for the removal of swirling waste combustion products from a cylinder of a reciprocating piston internal combustion engine comprising a port in the wall of said cylinder adapted to be uncovered by said piston near its bottom dead center position, said port having opposite walls generated by parallel straight lines, the side walls thereof subtending a predetermined portion of the circumference of said cylinder determinable by the structural strength thereof, said port having a flow coefficient defined as $$C_p = C_o \sqrt{\frac{P_o}{P_p}}$$

where $C_o$=the flow coefficient of an A. S. M. E. standard orifice having an area equal to the cross-sectional area of said port, $P_o$=the pressure drop across said orifice, and $P_p$=the pressure drop across said port, and the flow axis of said port being parallel to said side walls and perpendicular to the longitudinal axis of said cylinder and being disposed at an angle with respect to a cylinder radius through the center of the subtended circumferential portion such that the value of the product of said flow coefficient and the port cross-sectional area is a maximum, said angle varying in the range from 25° to 35°.

References Cited in the file of this patent

UNITED STATES PATENTS

| | | |
|---|---|---|
| 2,067,496 | McCarthy | Jan. 12, 1937 |
| 2,149,793 | Scheibe | Mar. 7, 1939 |
| 2,211,936 | Radelet et al. | Aug. 20, 1940 |

FOREIGN PATENTS

| | | |
|---|---|---|
| 226,800 | Great Britain | Dec. 18, 1924 |
| 439,423 | Great Britain | Dec. 2, 1935 |
| 498,014 | Germany | May 16, 1930 |
| 160,906 | Austria | Aug. 24, 1943 |